United States Patent
Aoe et al.

(10) Patent No.: US 9,248,945 B2
(45) Date of Patent: Feb. 2, 2016

(54) MOUTHPIECE STRUCTURE FOR PRESSURE VESSEL

(71) Applicant: TOYOTA JIDOSHA KABUSHIKI KAISHA, Toyota-shi, Aichi-ken (JP)

(72) Inventors: Ryuta Aoe, Nagoya (JP); Osamu Sekiguchi, Toyota (JP); Katsuya Manabe, Toyokawa (JP); Yoshinori Miyazaki, Nagoya (JP); Masayoshi Takami, Hamamatsu (JP); Masayoshi Taki, Konan (JP); Ken Hatta, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/592,440

(22) Filed: Jan. 8, 2015

(65) Prior Publication Data
US 2015/0197382 A1 Jul. 16, 2015

(30) Foreign Application Priority Data
Jan. 10, 2014 (JP) .................................. 2014-003565

(51) Int. Cl.
| | |
|---|---|
| *F17C 1/16* | (2006.01) |
| *B65D 53/02* | (2006.01) |
| *B65D 25/14* | (2006.01) |
| *B65D 81/20* | (2006.01) |
| *F16J 12/00* | (2006.01) |
| *F17C 1/00* | (2006.01) |

(52) U.S. Cl.
CPC .............. *B65D 53/02* (2013.01); *B65D 25/14* (2013.01); *B65D 81/20* (2013.01); *F16J 12/00* (2013.01); *F17C 1/00* (2013.01)

(58) Field of Classification Search
CPC .......... F17C 13/04; F17C 1/16; Y02E 60/321
USPC .................. 220/586, 582, 592, 601, 643, 644
See application file for complete search history.

(56) References Cited

U.S. PATENT DOCUMENTS

| | | | | |
|---|---|---|---|---|
| 5,429,845 A | * | 7/1995 | Newhouse | ................. F17C 1/16 138/30 |
| 6,089,399 A | * | 7/2000 | Felbaum | ............... B32B 15/013 220/582 |

(Continued)

FOREIGN PATENT DOCUMENTS

| | | |
|---|---|---|
| JP | 11-13995 | 1/1999 |
| JP | 2013-036603 | 2/2013 |

*Primary Examiner* — Steven A. Reynolds
*Assistant Examiner* — King M Chu
(74) *Attorney, Agent, or Firm* — Finnegan, Henderson, Farabow, Garrett & Dunner, L.L.P.

(57) ABSTRACT

A mouthpiece structure for a pressure vessel includes a liner made of a synthetic resin, and constituting a vessel body and a cylindrical part communicating between an interior and an exterior of the vessel body, a cylindrical mouthpiece mounted closely to an inner periphery of the cylindrical part, a retainer having a covering portion which covers regions of outer surfaces of the cylindrical part and the mouthpiece respectively and a peripheral wall surrounding the cylindrical part, the cylindrical part and the mouthpiece having an interface between an inner periphery of the cylindrical part and an outer periphery of the mouthpiece, the interface having a distal end facing the regions, a first sealing member disposed between the mouthpiece and the covering portion, and a second sealing member disposed between the cylindrical part and the peripheral wall of the retainer.

4 Claims, 7 Drawing Sheets

(56) References Cited

U.S. PATENT DOCUMENTS

| | | | | |
|---|---|---|---|---|
| 7,857,159 B2* | 12/2010 | Lindner | ............... | F16J 15/062 |
| | | | | 220/586 |
| 8,096,441 B2* | 1/2012 | Sato | ................ | F17C 1/06 |
| | | | | 220/582 |
| 8,186,536 B2* | 5/2012 | Strack | ............. | F17C 1/00 |
| | | | | 220/586 |
| 2010/0072209 A1* | 3/2010 | Hatta | ............... | F17C 1/16 |
| | | | | 220/586 |
| 2011/0108557 A1* | 5/2011 | Tani | ................ | F17C 1/16 |
| | | | | 220/586 |
| 2011/0220660 A1* | 9/2011 | Strack | ............. | F17C 1/06 |
| | | | | 220/586 |

\* cited by examiner

MOUTHPIECE STRUCTURE FOR PRESSURE VESSEL

CROSS-REFERENCE TO RELATED APPLICATIONS

This application is based upon and claims the benefit of priority from the prior Japanese Patent Application No. 2014-003565 filed on Jan. 10, 2014, the entire contents of which are incorporated herein by reference.

BACKGROUND

1. Technical Field

The present invention relates to a mouthpiece structure for a pressure vessel.

2. Related Art

Figure 6:
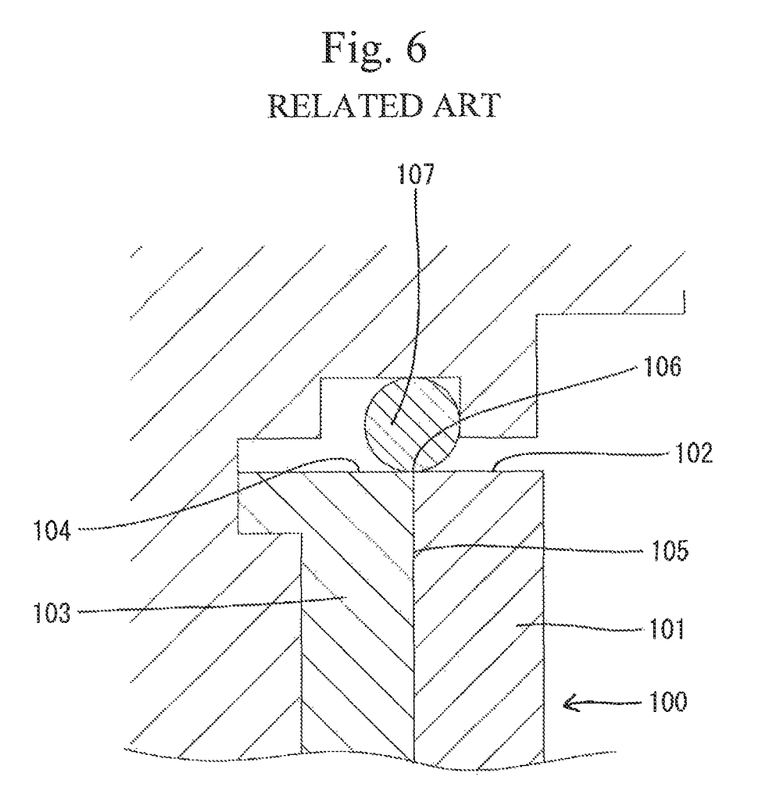
FIG. 6 is a partially enlarged cross-sectional view of a conventional mouthpiece structure.

Japanese Patent Application Publication No. JP-A-H11-13995 discloses a mouthpiece structure for a pressure vessel, which includes a liner made of a synthetic resin and constructing a vessel body and a cylindrical part communicating between an interior and an exterior of the vessel body, a cylindrical mouthpiece mounted to an inner periphery of the cylindrical part and a sealing member preventing a fluid in the vessel body from leaking through a gap between the inner periphery of the cylindrical part and an outer periphery of the mouthpiece. As shown in FIG. 6, the cylindrical part 101 of the liner 100 has a distal end surface 102. The mouthpiece 103 also has a distal end surface 104 which is adjacent to the distal end surface 102 so that both distal end surfaces 102 and 104 are coplanar. A gap between the adjacent distal end surfaces 102 and 104 serves as a leak outlet 106 through which the fluid leaking through an interface 105 between the inner periphery of the cylindrical part 101 and the outer periphery of the mouthpiece 103 flows outside the vessel. A sealing member 107 is disposed so as to close the leak outlet 106.

Figure 7:
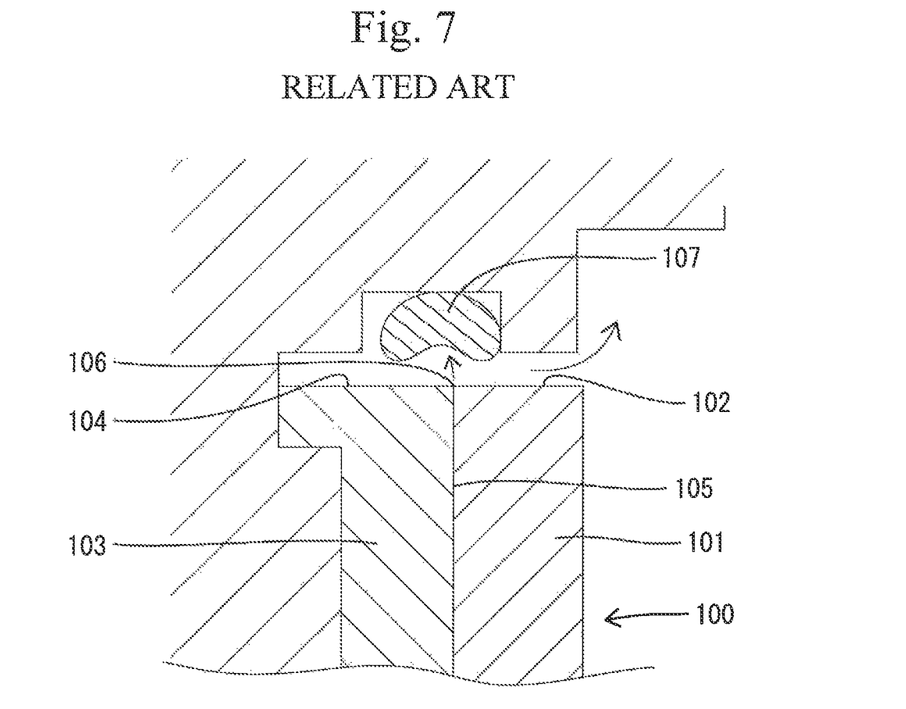
FIG. 7 is a partially enlarged cross-sectional view of the conventional mouthpiece structure, showing the irregularly deformed sealing member.

In the above-described mouthpiece structure, when the pressure of the fluid leaking from the leak outlet 106 is excessively large, there is a possibility that the sealing member 107 subjected to the fluid pressure would be irregularly deformed in a direction away from the leak outlet 106 while being axially pressed, as shown in FIG. 7. This irregular deformation of the sealing member 107 renders the leak outlet 106 open to the outside, resulting in loss of the sealing function.

SUMMARY

Therefore, an object of the invention is to provide a mouthpiece structure for the pressure vessel, which can improve the reliability of the sealing performance.

The invention provides a mouthpiece structure for a pressure vessel including a liner made of a synthetic resin and constituting a vessel body and a cylindrical part communicating between an interior and an exterior of the vessel body, a cylindrical mouthpiece mounted closely to an inner periphery of the cylindrical part, a retainer having a covering portion which covers regions of outer surfaces of the cylindrical part and the mouthpiece respectively and a peripheral wall surrounding the cylindrical part, the cylindrical part and the mouthpiece having an interface between an inner periphery of the cylindrical part and an outer periphery of the mouthpiece, the interface having a distal end facing the regions, a first sealing member disposed between the mouthpiece and the covering portion and a second sealing member disposed between the cylindrical part and the peripheral wall of the retainer.

According to the invention, fluid in the vessel body reaching the outer surfaces of the mouthpiece and the cylindrical part through the interface diverges into two leak paths of the radially inside and radially outside of the interface with the result that the pressure of the fluid is reduced. The leak path located radially inside the interface is cut off by the first sealing member, and the leak path located radially outside the interface is cut off by the second sealing member. Accordingly, fluid leak can be reliably prevented and reliability of the sealing performance can be improved.

DETAILED DESCRIPTION

In the mouthpiece structure, the second sealing member may be housed in a seal groove formed by recessing only an inner periphery of the peripheral wall. According to this construction, since differences in the thickness of the synthetic resin cylindrical part are small, shrinkage can be reduced in the molding of the cylindrical part with the result that the dimensional accuracy of the cylindrical part can be improved.

In the mouthpiece structure, the mouthpiece may be formed with a male thread, the structure may further include a nut which is threadingly engaged with the male thread thereby to press the covering portion against the mouthpiece side. According to this construction, since the nut independent of the retainer is used as a unit which fixes the retainer to the mouthpiece, the retainer can be assembled without rotation relative to the mouthpiece and the cylindrical part. This can avoid occurrence of a circumferential shear force applied to the first and second sealing members in a step of mounting the retainer and thereby prevent irregular deformation of the first and second sealing members.

The covering portion may abut against the region of the outer surface of the mouthpiece which the distal end of the interface faces. Consequently, an amount of crushing of the first sealing member can be rendered more stable.

The region of the outer surface of the cylindrical part which the distal end of the interface faces, may be non-contact with the covering portion. This increases the capacity of the leak path from the distal end of the interface to the second sealing member. As a result, the pressure of the leaking fluid is reduced, the sealing performance of the second sealing member can be improved.

A first embodiment will be described with reference to FIGS. 1 to 4. The pressure vessel A of the first embodiment has a storage 10 for storing a fluid (not shown) and a mouthpiece structure 13 serving as an inflow and outflow path of the fluid. The storage 10 has a double-layered structure including a vessel body 12 made of a synthetic resin and constituting a part of a liner 11 and an outer layer (not shown) covering a surface of the vessel body 12. A mixed resin layer of high-density polyethylene (HOPE) and ethylene-vinyl alcohol copolymer resin (EVOH) can be used as a material of the liner 11, for example. A carbon fiber reinforced plastic (CFRP) can be used as a material of the outer layer, for example.

Figure 1:
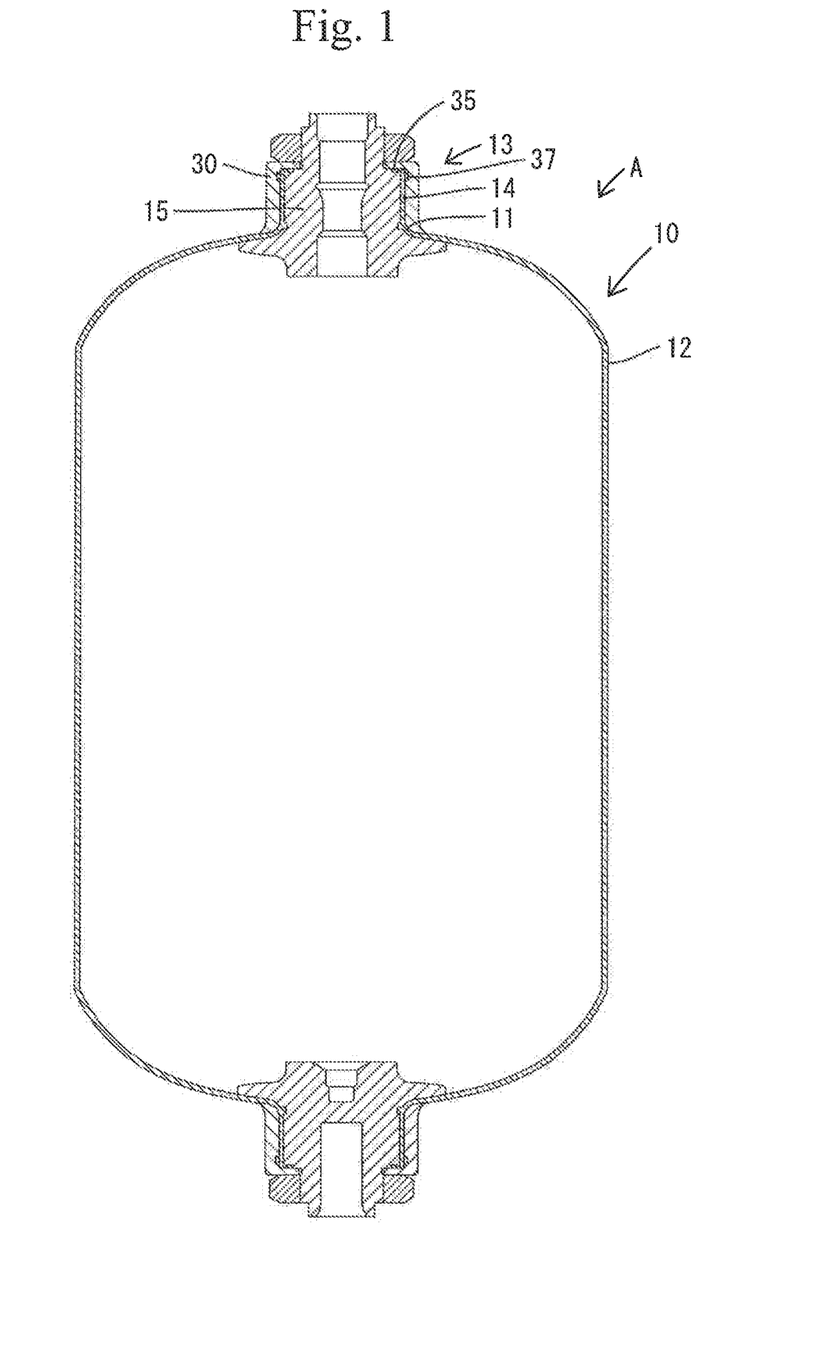
FIG. 1 is a cross-sectional view of the pressure vessel according to a first embodiment.
Figure 2:
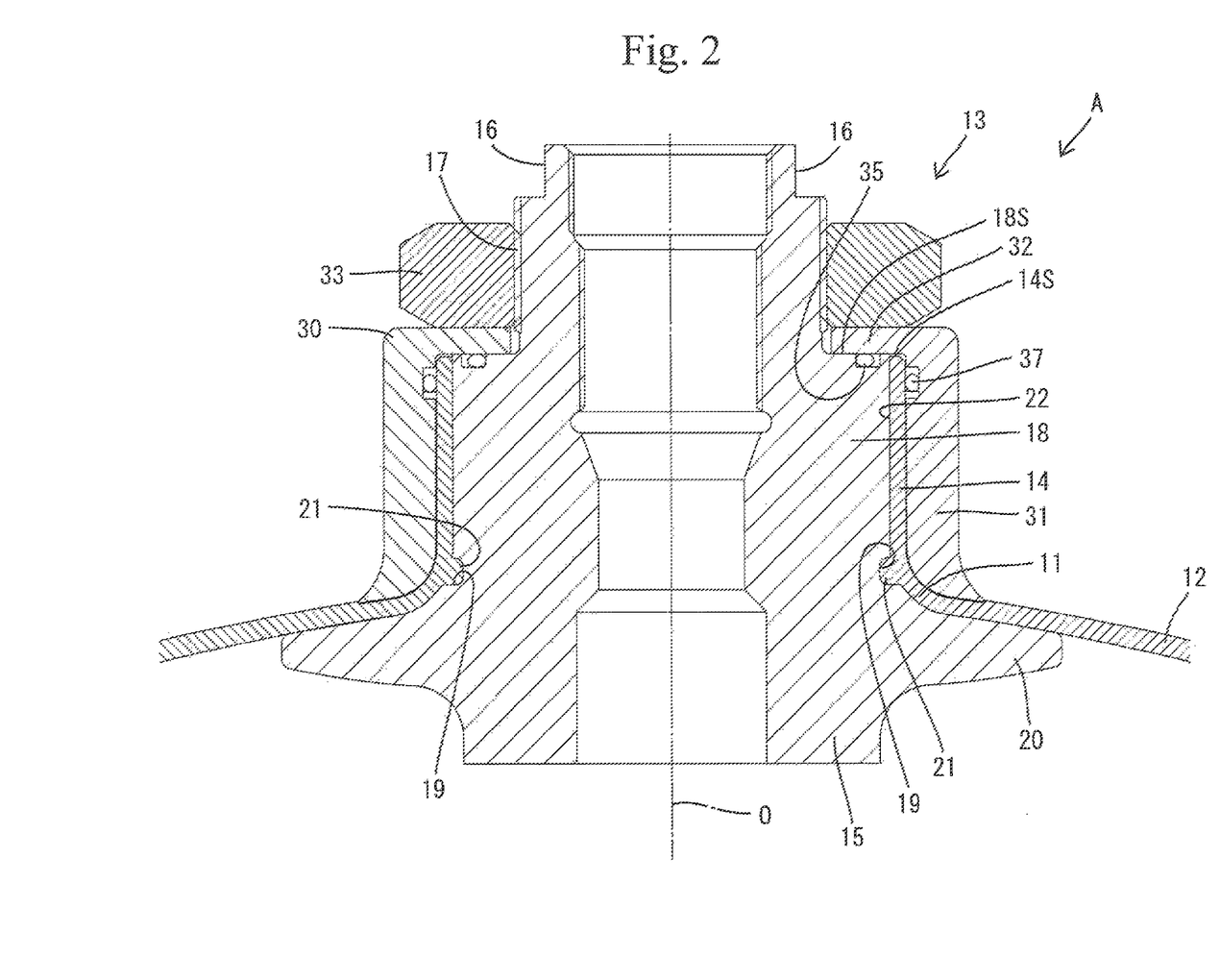
FIG. 2 is an enlarged cross-sectional view of the mouthpiece structure.

As shown in FIG. 2, the mouthpiece structure 13 includes a cylindrical part 14 constituting a part of the liner 11, a mouthpiece 15, a retainer 30, a first sealing member 35, a second sealing member 37, a nut 33 and a valve (not shown). The cylindrical part 14 is formed integrally with the vessel body 12 and communicates between an interior and an exterior of the vessel body 12 (the storage 10). The cylindrical part 14 has a cross-section that is normal to an axis line O thereof and has a circular shape. The cylindrical part 14 is coaxial with the mouthpiece 15. The cylindrical part 14 has a distal end formed with a distal end surface 14S (a region of an outer surface of the cylindrical part 14, which a distal end of an interface faces) that is normal to the axis line O of the cylindrical part 14 and the mouthpiece 15.

Figure 4:
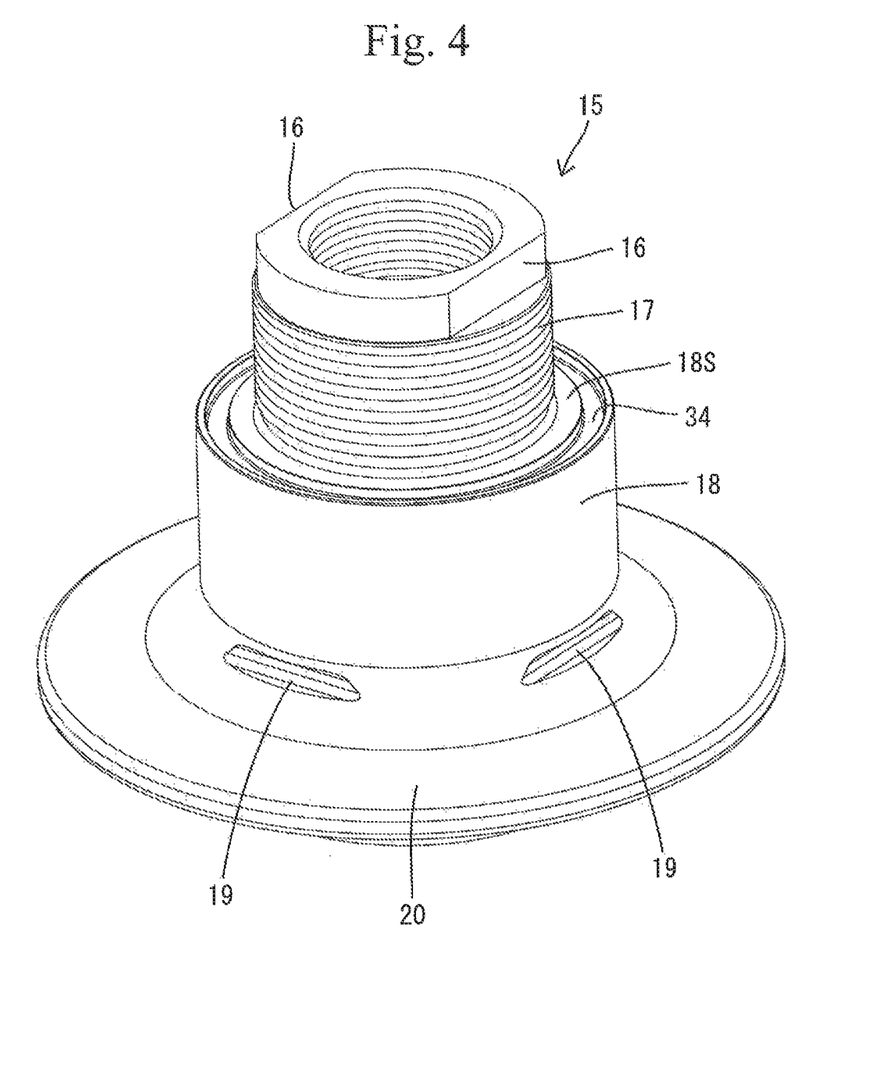
FIG. 4 is a perspective view of the mouthpiece.

The mouthpiece 15 is generally formed into a cylindrical shape and has a hollow interior in which a valve (not shown) is to be mounted. As shown in FIGS. 2 and 4, the mouthpiece 15 has an outer periphery including a most distal end side (an upper side in FIG. 4) formed with paired parallel surfaces 16 to which a tool (not shown) is to be fitted. The mouthpiece 15 has an outer periphery which includes a first region adjacent to a proximal end side (a lower side in FIG. 4) of the parallel surface 16, The first region is formed with a male thread 17 coaxial with the mouthpiece 15. The outer periphery of the mouthpiece 15 includes a second region adjacent to a proximal end side of the male thread 17. The second region serves as a larger diameter portion 18, which has a cross-section that is normal to the axis line O of the mouthpiece 15 and has a circular shape. The larger diameter portion 18 is coaxial with the mouthpiece 15. The larger diameter portion 18 has an outer peripheral proximal end formed with a plurality of circumferentially spaced cutouts 19. The cutouts 19 are formed by partially cutting out the outer peripheral proximal end of the larger diameter portion 18. The outer periphery of the mouthpiece 15 has a region which is adjacent to the proximal end side of the larger diameter portion 18 and is formed with a circular flange 20 having a larger diameter than the larger diameter portion 18.

The mouthpiece 15 is termed integrally with the liner 11 so as to be coaxial, with the cylindrical part 14, in the process of insert molding of the liner 11 (the vessel body 12 and the cylindrical part 14). As shown in FIG. 2, when the mouthpiece 15 is integrated with the liner 11, the inner periphery of the cylindrical part 14 adheres closely to the outer periphery of the larger diameter portion 18 in an airtight or liquidtight manner. Further, the vessel body 12 has an inner surface including a region which is adjacent to the cylindrical part 14 and adheres closely to a surface of the flange 20 in an airtight or liquidtight manner. Still further, the cylindrical part 14 has a plurality of lock protrusions 21 formed on an inner peripheral proximal end thereof. The lock protrusions 21 are fitted in the cutouts 19 of the mouthpiece 15 respectively. As the result of the fitting, the cylindrical part 14 (the liner 11) and the mouthpiece 15 are positioned so as to be prevented from relative displacement in a direction, of the axis line O and relative displacement in the circumferential direction.

The larger diameter portion 18 has an end surface located at the male thread 17 side and serving as a stepped surface 18S (a region of an outer surface of the mouthpiece, which the distal end of the interface faces) which is normal to the axis line O of the mouthpiece 15. The stepped, surface 18S is located radially inside a distal end surface 14S of the cylindrical part 14 and disposed to be adjacent to the distal end surface 14S nearly in a coplanar state (nearly at the same position in the direction of axis line O). An interface 22 between the inner periphery of the cylindrical part 14 and the outer periphery of the mouthpiece 15 (the larger diameter portion 18) has a distal end which faces the distal end surface 14S and the stepped surface 18S. The interface 22 has a proximal end which faces an interior of the storage 10 (the vessel body 12) on an outer peripheral edge of the flange 20.

Accordingly, the interface 22 should be originally closed in an airtight or liquidtight manner to prevent the fluid in the storage 10 (the vessel body 12) from passing therethrough. However, a slight gap can occur in the interface 22 due to differences in the linear expansion coefficient in an environment with large temperature changes, pressure increase in the storage 10 and the like. In this case, the interface 22 having the gap can be a leak path through which the fluid in the storage 10 (the vessel body 12) can reach the distal end surface 14S and the stepped surface 18S. In the embodiment, a sealing unit is provided for preventing the fluid having passed the interface 22 from leaking out of the pressure vessel A.

The sealing unit includes a retainer 30, a first sealing member 35 and a second sealing member 37. The retainer 30 is made of a metal material such as an aluminum alloy. The retainer 30 is generally formed into a cylindrical shape and is coaxial with the cylindrical part 14 and the mouthpiece 15. The retainer 30 has a cylindrical peripheral wall 31 and a covering portion 32 projecting radially inward from a distal, end of the peripheral wall 31 into the shape of an annular plate. The retainer 30 is assembled to the mouthpiece 15 and the cylindrical part 14 from the distal end side of the mouthpiece structure 13 to be fixed in the assembled state by pressing the nut 33 threadingly engaged with the male thread 17.

When the retainer 30 is in the assembled state, the covering portion 32 abuts against the stepped surface 18S of the mouthpiece 15 in a contact state and is opposed to a distal end surface 14S of the cylindrical part 14 in a non-contact state with a slight space between the covering portion 32 and the distal end surface 14S of the cylindrical part 14. More specifically, the distal end of the interface 22 between the inner periphery of the cylindrical part 14 and the outer periphery of the mouthpiece 15 faces regions included in outer surfaces of the cylindrical part 14 and the mouthpiece 15 respectively and the covering portion 32 covers the regions. Also, when the retainer 30 is in the assembled, state, the peripheral wall 31 continuous to an outer peripheral edge of the covering portion 32 surrounds the outer peripheral surface of the cylindrical part 14 (that is, a region continuous to the distal end surface 14S) in a positional relationship such that the peripheral wall 31 are opposed to the outer peripheral surface of the cylindrical part 14 in an entire periphery while abutting against or coming close to the cylindrical part 14.

Figure 3:
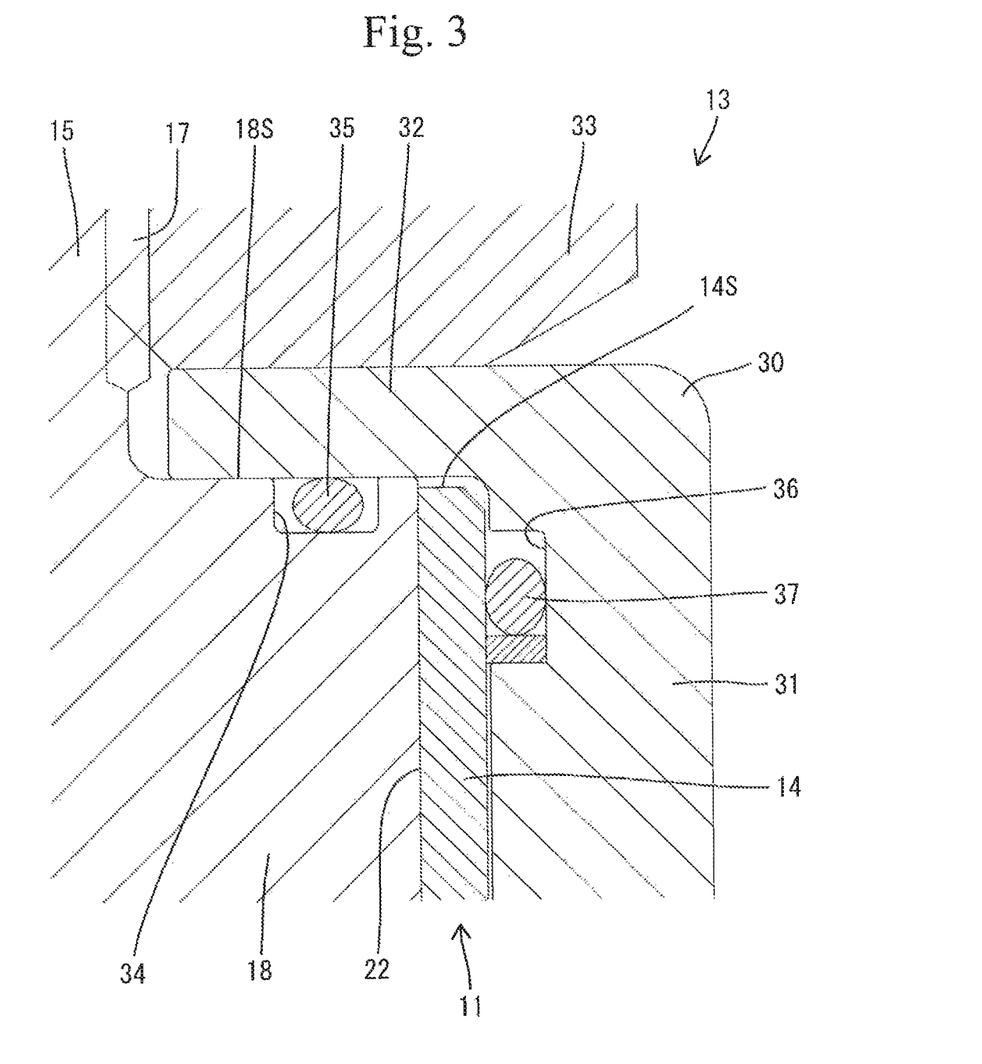
FIG. 3 is a partially enlarged cross-sectional view of the mouthpiece structure.

The fluid in the vessel body 12 passes through the interface 22 to reach the stepped surface 18S and the distal end surface 14S. The fluid further continues to leak from the interface 22 both radially inside and radially outside in a divergent manner. A sealing unit is provided for preventing the fluid from leaking in radially inside relative to the interface 22. The sealing unit is configured as follows. As shown in FIG. 3, a first seal groove 34, which is circular in shape and coaxial with the mouthpiece 15, is formed by recessing the stepped surface 18S over an entire circumference thereof. A first sealing member 35 which is comprised of an O ring and is elastically deformable is housed in the first seal groove 34. The first sealing member 35 adheres in an airtight or liquidtight manner to an inner surface of the covering portion 32

(that is a surface opposed to the stepped surface 18S). A gap between the stepped surface 18S and the inner surface of the covering portion 32 is sealed by the first sealing member 35 in an airtight or liquidtight manner so that the fluid can be prevented from leaking through the gap.

A sealing unit is provided for preventing the fluid from leaking in radially outside relative to the interface 22. The sealing unit is configured as follows. The peripheral wall 31 of the retainer 30 has an inner peripheral surface which is recessed to be formed into a second seal groove 36 continuous over an entire circumference thereof. A second sealing member 37 which is comprised of an O ring and is elastically deformable is housed in the second seal groove 36. The second sealing member 37 adheres in an airtight or liquidtight manner to an outer surface of the cylindrical part 14 (that is, a surface opposed to the peripheral wall 31). A gap between the outer peripheral surface of the cylindrical part 14 and the inner surface of the peripheral wall 31 is sealed by the second sealing member 37 in an airtight or liquidtight manner so that the fluid can be prevented from leaking through the gap. Accordingly, even when the fluid passes through the interface 22 to reach the stepped surface 18S and the distal end surface 14S, there is no possibility that the fluid leaks out of the pressure vessel A.

The mouthpiece structure 13 for the pressure vessel A according to the first embodiment includes the synthetic resin liner 11 constituting the vessel body 12 and the cylindrical part 14 communicating between the interior and the exterior of the vessel body 12, and the cylindrical mouthpiece 15 which adheres closely to the inner periphery of the cylindrical part 14. Accordingly, it is concerned that the fluid reaching the outer surfaces of the mouthpiece 15 and the cylindrical part 14 through the interface 22 leaks while diverging radially inside and radially outside the interface 22.

In view of this, the mouthpiece structure of the embodiment further includes the retainer 30, the first sealing member 35 and the second sealing member 37. The distal end of the interface 22 faces the regions (the distal end surface 14S and the stepped portion 18S) included in the outer surfaces of the cylindrical part 14 and the mouthpiece 15 respectively. The retainer 30 includes the covering portion 32 covering the regions and the peripheral wall 31 surrounding the cylindrical part 14. The first sealing member 35 is disposed between the mouthpiece 15 and the covering portion 32, and the second sealing member 37 is disposed between the cylindrical part 14 and the peripheral wall 31. According to this construction, the fluid in the vessel body 12 reaching the outer surfaces of the mouthpiece 15 and the cylindrical part 14 through the interface 22 diverges into two leak paths of the radially inside (the covering portion 32 side) and radially outside (the peripheral wail 31 side) of the interface 22.

However, the leak path located radially inside the interface 22 is cut off by the first sealing member 35, and the leak path located radially outside the interface 22 is cut off by the second sealing member 37. Accordingly, leak of fluid can be reliably cut off by the first and second sealing members 35 and 37. Further, since pressure of the fluid flowing from an upper end (leak outlet) of the interface 22 is reduced by an increase in the capacity in the paths leading to both sealing members 35 and 37, both sealing members 35 and 37 can perform the sealing functions more effectively. Thus, according to the mouthpiece structure of the first embodiment, the fluid can be reliably prevented from leaking and the reliability of the sealing function can be improved.

The second seal groove 36 housing the second sealing member 37 is recessed only the inner periphery of the peripheral wall 31 in the mouthpiece structure of the first embodiment. According to this construction, since differences in the thickness of the synthetic resin cylindrical part 14 are small, shrinkage can be reduced in the molding of the cylindrical part 14 with the result that the dimensional accuracy of the cylindrical part 14 can be improved.

The mouthpiece 15 is formed with the male thread 17, with which the nut 33 pressing the covering portion 32 against the mouthpiece 15 side is configured to be threadingly engaged, in other words, the nut 33 independent of the retainer 30 is used as a unit which fixes the retainer 30 to the mouthpiece 15. According to this construction, the retainer 30 can be assembled without rotation relative to the mouthpiece 15 and the cylindrical part 14. This can avoid occurrence of a circumferential shear force applied to the first and second sealing members 35 and 37 in a step of mounting the retainer 30. Accordingly, irregular deformation of the first and second sealing members 35 and 37 can be prevented, and eventually, reduction in the sealing performances of the first and second sealing members 35 and 37 can be avoided.

Further, since the covering portion 32 abuts a against the stepped surface 18S of the mouthpiece 15, an amount of crushing of the first sealing member 35 provided between the covering portion 32 and the stepped surface 18S is rendered more stable with the result that the sealing performance of the first sealing member 35 is stabilized. Further, since the distal end surface 14S of the cylindrical part 14 (a region of the outer surface of the cylindrical part 14 which the distal end of the interface 22 faces) is non-contact with the covering portion 32, the capacity of the leak path from the distal end of the interface 22 to the second sealing member 37 is increased. This reduces the pressure of the leaking fluid with the result that the sealing performance of the second sealing member 37 can be improved.

Figure 5:
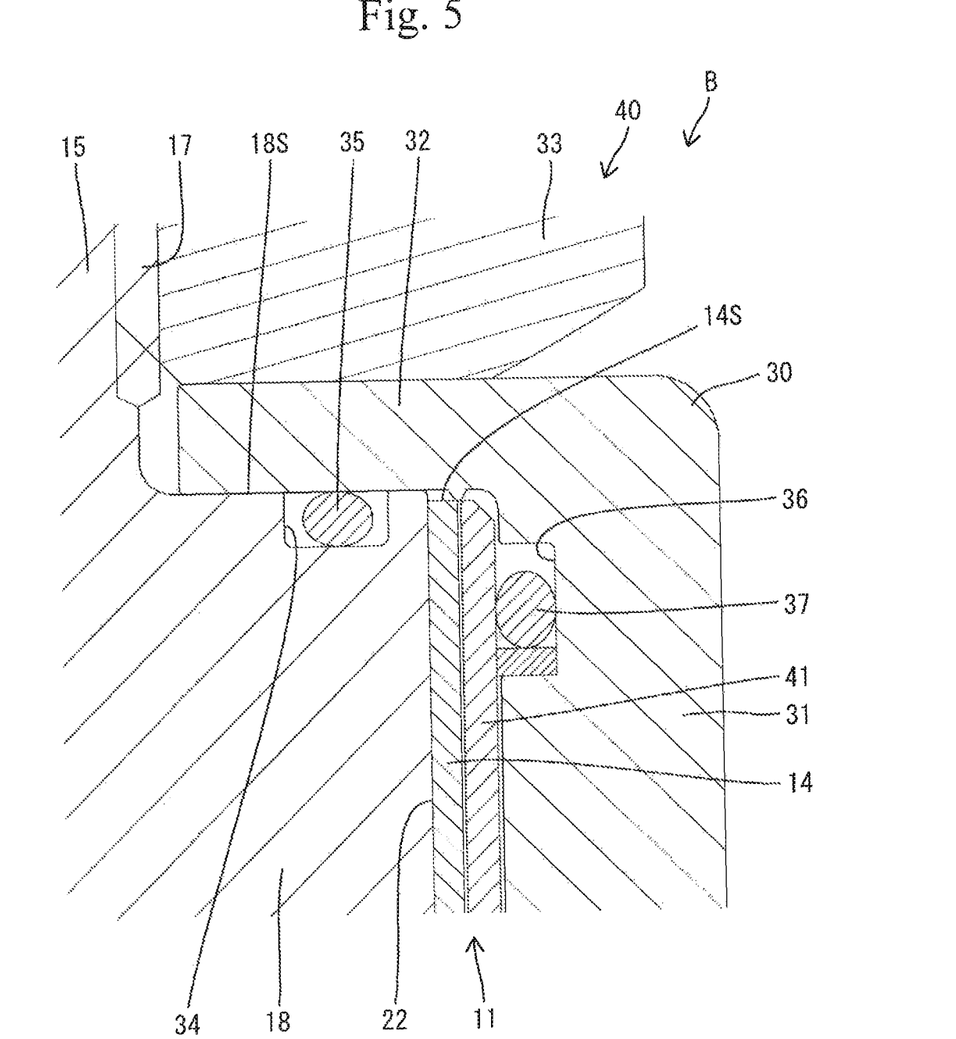
FIG. 5 is a partially enlarged cross-sectional view of the mouthpiece structure according to a second embodiment.

Next, a second embodiment will be described with reference to FIG. 5. The pressure vessel B in the second embodiment differs from the first embodiment in the provision of a barrier layer 41 covering an outer surface of the liner 11 constituting the mouthpiece structure 40. The peripheral wail 31 of the retainer 30 is disposed opposite the outer peripheral surface of the barrier 41 but not opposed to the outer peripheral surface of the cylindrical part 14. The second sealing member 37 housed in the second seal groove 36 in the inner peripheral surface of the peripheral wail 31 adheres closely to an outer peripheral surface of the barrier layer 41 in the airtight or liquidtight manner. The fluid (not shown) flows out of the vessel body 12 through the interface 22 of the mouthpiece is and the cylindrical part 14. Even when flowing radially outward relative to the interface 22, the fluid is prevented by the second sealing member 37 from leaking out of the pressure vessel B. The other construction of the mouthpiece structure of the second embodiment is the same as that of the first embodiment and accordingly, identical or similar parts in the second embodiment are labeled by the same reference symbols as those in the first embodiment and the description of structure, working and effect will be eliminated.

The foregoing embodiments should not be restrictive but may be modified or expanded as follows.

(1) Although the space defining the first seal groove is formed by recessing only the mouthpiece in the first and second embodiments, only the covering portion of the retainer may be recessed or both mouthpiece and the covering portion may be recessed.

(2) Although the space defining one second seal groove is formed by recessing only the peripheral wail of the retainer in the first embodiment, only the cylindrical part, may be recessed or both peripheral wail of the retainer and cylindrical part may be recessed.

(3) Although the space defining the second seal groove is formed by recessing only the peripheral wail of the retainer in the second embodiment, only the barrier layer may be recessed or both peripheral wall of the retainer and barrier layer may be recessed.

(4) Although the outer surface (the stepped surface) of the mouthpiece formed with the first seal groove is the plane normal to the axis line in the first and second embodiments, the outer surface (the stepped surface) of the mouthpiece where the first seal groove is open may be a plane or a curved surface inclined relative to the axis line.

(5) Although the retainer and the nut are parts independent of each other in the first and second embodiments, the retainer and the nut may be a single part. In this case, the male thread is screwed into the female thread formed in the retainer so that the retainer is fixed to the mouthpiece.

(6) Although the covering portion abuts against the stepped surface of the mouthpiece (the region of the outer surface of the mouthpiece which the distal end of the interface faces) in the first and second embodiments, the covering portion may not abut against the stepped surface of the mouthpiece.

(7) Although the covering portion is non-contact, with the distal end surface of the cylindrical part (the region of the outer surface of the cylindrical part which the distal end of the interface faces), the covering portion may abut against the distal end surface of the cylindrical part.

While particular embodiments have been described herein for purposes of illustration, many modifications and changes will become apparent to those of skilled in the art. Accordingly, the appended claims are intended to encompass all such modifications and changes.

What is claimed is:

1. A mouthpiece structure for a pressure vessel, comprising:
    a liner made of a synthetic resin and constituting a vessel body and a cylindrical part communicating between an interior and an exterior of the vessel body;
    a cylindrical mouthpiece mounted closely to an inner periphery of the cylindrical part;
    a retainer having a covering portion which covers regions of outer surfaces of the cylindrical part and the cylindrical mouthpiece respectively and a peripheral wall surrounding the cylindrical part, the cylindrical part and the cylindrical mouthpiece having an interface between an inner periphery of the cylindrical part and an outer periphery of the cylindrical mouthpiece, the interface having a distal end facing the regions;
    a first sealing member disposed between the cylindrical mouthpiece and the covering portion; and
    a second sealing member disposed between the cylindrical part and the peripheral wall of the retainer,
    wherein the cylindrical mouthpiece is formed with a male thread, the mouthpiece structure further comprising a nut which is threadingly engageable with the male thread thereby to press the covering portion against the cylindrical mouthpiece.

2. The structure according to claim 1, wherein the second sealing member is housed in a seal groove formed by recessing only an inner periphery of the peripheral wall.

3. The structure according to claim 1, wherein the covering portion abuts against the region of the outer surface of the cylindrical mouthpiece which the distal end of the interface faces.

4. The structure according to claim 1, wherein the region of the outer surface of the cylindrical part which the distal end of the interface faces, is non-contact with the covering portion.

* * * * *